United States Patent

[11] 3,623,738

[72] Inventor Robert W. MacDonnell
  Crete, Ill.
[21] Appl. No. 18,605
[22] Filed Mar. 11, 1970
[45] Patented Nov. 30, 1971
[73] Assignee Unity Railway Supply Co., Inc.
  Chicago, Ill.
  Continuation-in-part of application Ser. No. 697,131, Jan. 11, 1968, now abandoned. This application Mar. 11, 1970, Ser. No. 18,605

[54] REAR SEAL
  4 Claims, 8 Drawing Figs.
[52] U.S. Cl. .................................................. 277/132, 277/DIG. 4
[51] Int. Cl. ..................................................... F16j 15/32
[50] Field of Search ........................................... 277/130, 131, 132, 237 A, DIG. 4, 174

[56] References Cited
  UNITED STATES PATENTS
  2,071,736  2/1937  Farmer .......................... 277/174
  2,257,119  9/1941  Johannesen .................... 277/131
  2,692,783  10/1954 Foss ............................. 277/132
  3,383,145  5/1968  Hennessy, Jr. ................. 277/132 X Primary Examiner—Edward J. Earls
Attorneys—E. Manning Giles, J. Patrick Cagney and Peter S. Lucyshyn ABSTRACT: Dustguards of rubber mat form are provided having a rigid outer frame portion of the size and shape of the dustguard slot, having a circular bellows portion spaced from the outer frame portion and integrally connected thereto by a planar intermediate web portion, the bellows portion terminating in a semirigid ring portion capable of maintaining substantial circular stability during limited axial and transverse shifting accommodated by the bellows portion. The web is of less axial thickness than the frame and ring portions. The ring terminates in an integral flexible wiping finger of circular form and slightly smaller in diameter than the journal seat. The web portion is provided with an array of generally radial ribs that resist stretching and thereby assist in maintaining the ring portion circular even during severe transverse shifting of the journal. The rigid outer frame has a pair of seal fins extending around each major face region thereof. In one form, a metal frame insert is incorporated in the mat to impart desired rigidity.

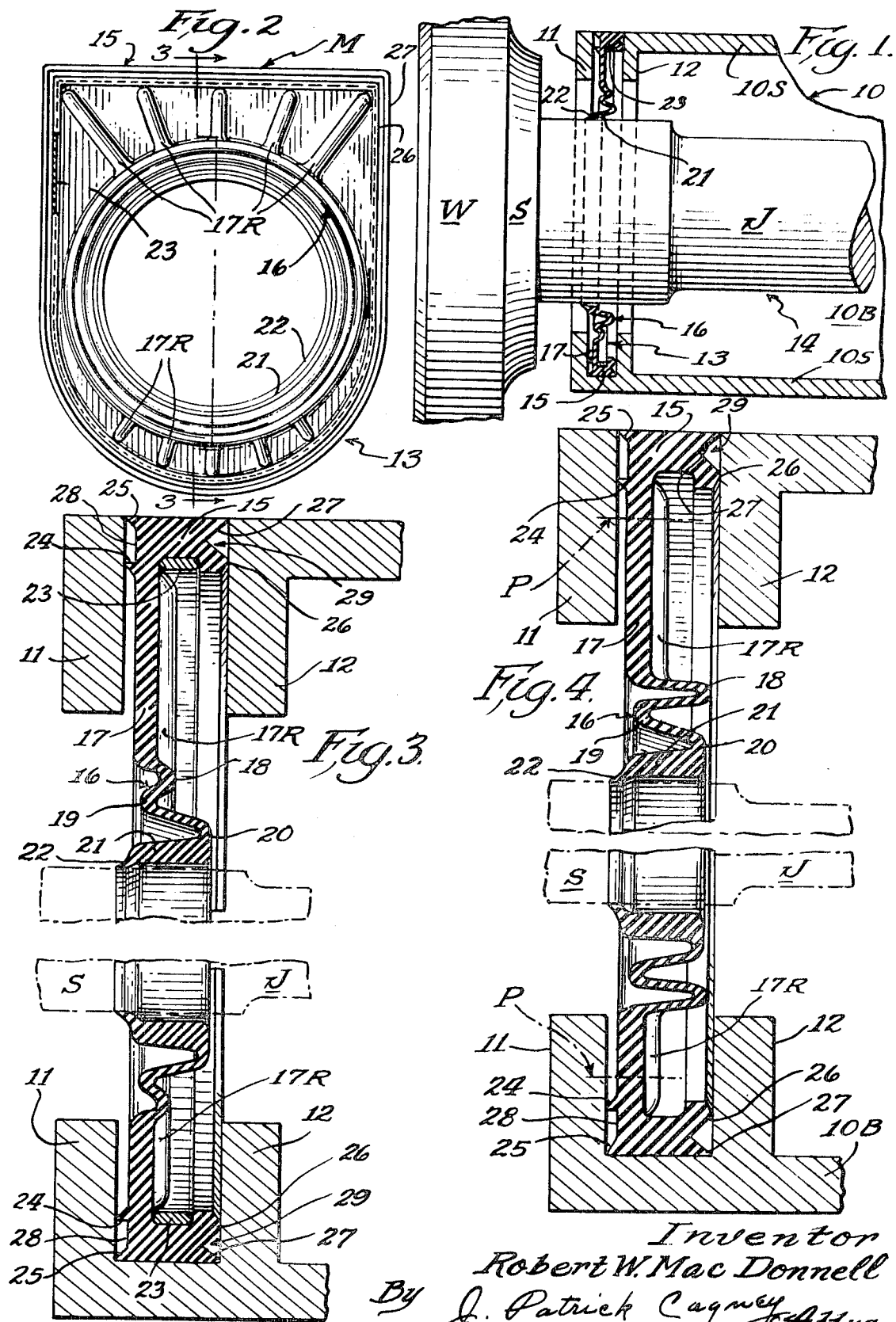

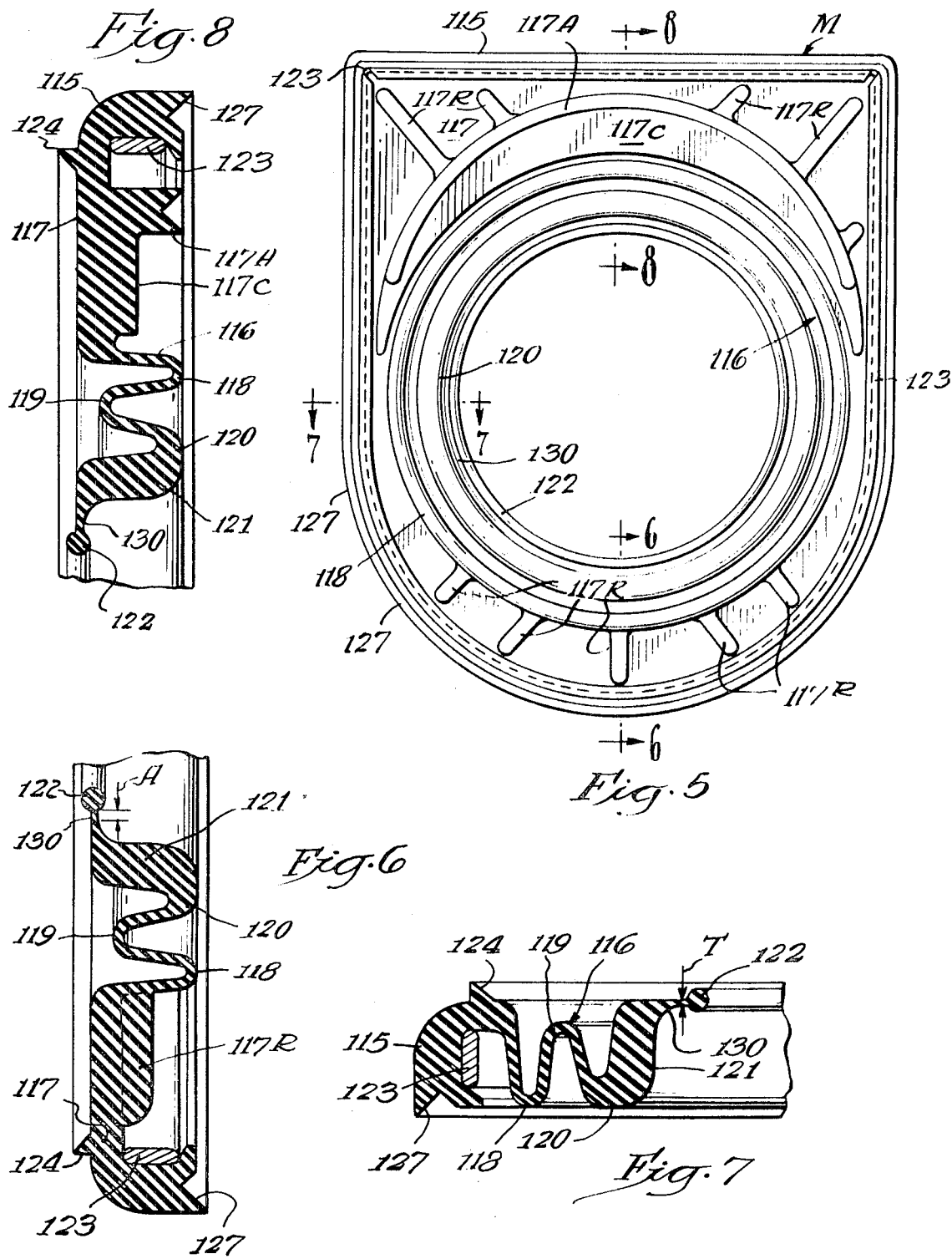

3,623,738

REAR SEAL

This application is filed as a continuation-in-part of copending application Ser. No. 697,131 filed Jan. 11, 1968, and now abandoned.

BACKGROUND OF THE INVENTION

This invention relates to dustguards for mounting in the usual dustguard well or slot at the inner end of a railway car journal box of the type approved for use in interchange by the A.A.R. The dustguard is to effect a wiping seal with the journal seat portion of a wheeled journal capable of following the axial and transverse shifting movements of the journal with respect to the journal box. The dustguard should also effect a stationary seal with the dustguard slot walls to prevent escape of oil from the journal box and to prevent ingress of dirt, dust and other foreign material.

SUMMARY OF PRIOR ART

Numerous dustguards have been devised over the years and many patents have been obtained but there remains a need for a simplified, highly reliable and long-lived dustguard. Many prior art dustguards fail to fill or fail to effectively establish a seal at the outermost extremities of the dustguard slot so that foreign particles are permitted to accumulate at these regions and ultimately work their way into the journal box to attack the journal surface. Many prior art dustguards fail to provide a journal seal capable of maintaining the required circular form while floating with the journal seat during shifting movements thereof in the journal box. Finally, many prior art dustguards fail to shut off the tortuous oil leakage path that exists along the vertical surfaces of the dustguard slot walls that underlie the journal seat.

Typical prior patents relating to dustguards include Rogers U.S. Pat. No. 2,958,551, Bayerl U.S. Pat. No. 3,041,091 and Hennessy U.S. Pat. No. 3,059,938.

SUMMARY OF THE INVENTION

The present invention provides a simplified dustguard construction that offers a reliable and long-lived all purpose sealing action. The dustguard of this invention substantially fills the dustguard slot so as to avoid accumulation of foreign particles, it provides a labyrinth seal closely adjacent and entirely around the outer extremities of the dustguard slot to oppose foreign particles working in from the top and to oppose oil escaping at the bottom, and it provides a floating center seal to cooperate with the journal seat and to maintain a stable circular form as it follows shifting movements thereof.

The dustguard of this invention comprises a mat of molded rubberlike material of a size and shape to extend to the outer extremities of the slot, the mat having means providing a rigid outer frame portion sealingly contacting the confronting wall surfaces of the slot adjacent to the outer extremities thereof, the mat having a circular bellows portion spaced from and integrally joined to the rigid frame portion through an intermediate planar web portion that encircles the bellows, the bellows portion integrally merging inwardly with a semirigid ring portion having substantial circular stability during axial and transverse floating movement thereof accommodated by the bellows, and the ring portion terminating in an integral flexible wiping finger portion of circular outline and of slightly smaller diameter than the journal seat portion to establish and maintain full length contact therewith during axial and transverse shifting of the journal seat relative to the journal box.

Generally radially extending ribs are provided in integrally upstanding relation on regions of the planar web above and below the journal to stiffen the web against radial stretching so that circular stability of the wiping finger is insured during transverse shifting of the journal. The wiping finger is offset towards the wheel end of the journal box to allow increased axial shifting of the journal.

In one embodiment, a metal frame insert is incorporated in the outer frame portion and in a second embodiment, a higher durometer rubber forms the outer frame portion to impart desired rigidity. In each embodiment, the outer frame portion has pairs of integral seal fins on opposite faces to establish complete labyrinth seals adjacent outer extremities of the slot.

An improvement on the first embodiment provides a uniquely flexible wiping finger integrally joined to the stable ring portion through a hinge portion of reduced thickness for reverse flexing to accommodate shifting of the wiping finger in accordance with axial movements of the journal. In addition, the web is provided with a common arcuate rib interconnecting the top group of radial ribs to insure circular stability and symmetry for supporting the bellows.

Other features and advantages of the invention will be apparent from the following description and claims and are illustrated in the accompanying drawings which show structure embodying features of the present invention and the principles thereof.

DESCRIPTION OF THE DRAWINGS

In the accompanying drawings forming a part of the specification, and in which like numerals are employed to designate like parts throughout the same, FIG. 1 is a longitudinal vertical section through a conventional journal box and showing a wheeled journal projecting through an opening at the inner end of the journal box and engaged by a rear seal or dustguard located in the usual dustguard slot;

FIG. 2 is a front elevational view of the rear seal of this invention;

FIG. 3 is an enlarged fragmentary vertical section showing the mounting relationship of the seal in the dustguard slot and is taken approximately as indicated by the line 3—3 of FIG.

FIG. 4 is a section similar to that of FIG. 3 and illustrating another embodiment of the invention;

FIG. 5 is a front elevational view showing an improved rear seal embodiment having a hinge for flexibly carrying a journal wiping finger; and FIGS. 6, 7 and 8 are enlarged fragmentary sectional views taken on the lines 6—6, 7—7 and 8—8 of FIG. 5.

DESCRIPTION OF PREFERRED EMBODIMENTS

Referring now to FIG. 1 of the drawings, a conventional journal box is designated generally at 10 and includes vertical sidewalls 10S merging with and connected by a curved bottom 10B, the wheel end of the box having the usual spaced vertical rear walls 11 and 12 defining a dustguard slot which is open across the top to receive the rear seal of this invention which is designated generally at 13. The vertical rear walls 11, 12 that bound the slot present confronting surfaces provided with aligned axial openings, the slot also being bordered by interior end surfaces of the journal box walls 10S, 10B. A wheeled journal unit 14 is shown associated with the journal box and includes the usual wheel W, the journal seat portion S and the actual journal portion J which is of slightly less diameter than the seat portion. The journal seat portion is received through the axial openings in the walls 11, 12 and extends through the dustguard slot to be engaged in sealing wiping relation by a flexible finger that defines the inner periphery of the rear seal.

The rear seal is pictured in elevation in FIG. 2 wherein it is seen to comprise a one-piece mat M of rubberlike material that includes an outer rigid frame portion 15 of a closed U-shaped configuration that has the same size and shape as the outer boundaries of the dustguard slot, a circular bellows portion 16 spaced from the frame portion 15 and an intermediate generally annular planar web portion 17 having a closed U-shaped outer extremity merging with the rigid frame portion and having a circular inner extremity merging with the bellows portion.

With reference to FIG. 3, the bellows portion 16 is seen to have a first low amplitude outer undulation presenting oppositely facing circular crests 18, 19 and an inner larger amplitude undulation presenting a circular crest 20. The base of the inner undulation is enlarged radially and axially to present a semirigid ring portion 21 which carries a flexible wiping finger 22. The ring portion 21 can undergo limited axial and transverse follower movement occasioned by shifting of the journal with respect to the journal box. The semirigid structure imparts a degree of circular stability to the center ring 21 which is important to assure full length contact of the wiping finger 22 about the periphery of the journal seat during conditions when the journal has shifted from its normal centered position with respect to the journal box.

Further structural features for insuring circular stability during journal shifting movement include an array of generally radially extending ribs 17R provided in integrally upstanding relation on the web portion 17 at regions above and below the journal. These ribs 17R extend to the approximate height of the low amplitude crest 18, as shown in FIG. 3, and serve as stiffening means for preventing radial stretching of the web portion 17 in the case of horizontal transverse shifting movement of the journal. There is a tendency associated with horizontal transverse shifting of the journal for stretching of the web portion 17 to occur in a fashion tending to cause the ring portion 21 to assume an oval shape leading to gapping between the finger 22 and the journal seat S. The ribs 17R restrict this radial stretching sufficiently to allow the ring portion 21 to maintain its circular form and thereby insure against such gapping. It may also be noted that the thickened ring portion 21 is wider than the ribs 17R and, in fact, has a greater dimension axially than radially so that the ring is not subject to bodily twisting or inverting in the presence of extended axial shifting movements. The ring 21 carries the finger 22 at a location that is offset axially away from the fillet region that joins the journal seat S and the journal J so that wiping contact with the journal seat S is maintained even where the journal shifts as much as 2 inches axially.

In the embodiment of FIG. 3, the outer frame portion 15 is held rigid by use of a metal frame insert 23 of hot rolled steel which nests within the thickened boundary portion of the outer frame. In this structure, the entire mat M be of 60 durometer rubber. The thickened outer frame portion 15 is shown to include inner and outer fin portions 24, 25 on its rearward or wheelside face and inner and outer fin portions 26, 27 on its outward or journalside face, the first set of fin portions being spaced apart by a planar wall surface 28 and the second set of fin portions being shown spaced apart by a V notch 29.

In the embodiment shown in FIG. 4, the seal is entirely of rubber in which case the mat M has its outer rigid frame portion 15 of 90 durometer up to the regions indicated by the phantom lines with the remainder of the mat being of 60 durometer and having similar structural portions defined by corresponding reference numerals. The outer undulation of the bellows 16 is shown at increased amplitude in the embodiment of FIG. 4 to locate the crest 18 in a common plane with the crest 20 and afford even greater freedom of floating action for the semirigid ring 21. The ribs 17R are only about half as high as the crest 18 in FIG. 4.

In a typical journal and journal box arrangement for a journal of 5×9 size, the mat is of a rubber identified as ASTM SC–620 and has an overall width of 8 ¾ inches, a height of 11 7/16 inches, a central opening of 5⅝ inches diameter at the tip of the wiping finger 22 and of 6⅛ inches diameter at the inner extremity of the circular ring portion 21 that carries the finger 22. The dustguard slot is nominally ¾ inches (plus ⅛ minus zero) so that the rigid marginal frame portion 15 has a solid axial thickness of 9/16 inches and a transverse thickness of 5/16 inches. The peak-to-peak dimension of the fins 24, 25 to the fins 26, 27 is ⅞ inches. The flat wall portion 17 has a thickness of 13/32 inches and the bellows undulations are about 5/32 inches thick. The ring portion 21 is about ⅝ inches axial thickness and ¼ inch radial thickness.

For the embodiment of FIG. 3, the metal ring insert is about ⅜ inches by 0.10 inches in section and seats snugly within the inner peripheral nest defined by the outer frame portion 15.

In the application of the seal of this invention, the mat M extends to and substantially fills the outer extremities of the dustguard slot. The rigid frame portion 15 of the mat fits snugly along the extremities of the slot so that the fins 24, 25, 26, 27 establish continuous sealing contact with the respective confronting surfaces of the walls 11, 12. There is no pocket at the top of the dustguard slot where foreign particles may accumulate and the fins' continuous contact relation inhibits ingress of foreign particles that may land temporarily along the smooth top edge face of the mat.

While the frame portion 15 remains essentially stationary, the bellows 16 allows the circular ring portion 21 to undergo limited axial and transverse follower movement with the journal. The stiffening action of the antistretch ribs 17R allows the ring portion 21 to maintain an essentially circular contour to prevent gapping to enable the flexible finger 22 to effect a continuous wiping contact with the journal seat. Another potential leakage path exists up and down the vertical lower surfaces of the walls 11, 12 which border the bottom central region of the dustguard slot. The fins 24, 25, 26, 27 establish a labyrinth seal effect to prevent oil loss along this tortuous path, with the stability of the outer frame portion being depended upon to maintain this seal under diverse operating conditions. The one-piece mat structure provides the present dustguard with a simplified and reliable performance.

An improved rear seal embodiment corresponding generally to the reinforced mat type of FIG. 1, is shown in FIG. 5 to 8 and is identified by corresponding reference numbers of the 100 series. Thus, the mat M of FIG. 5 has an outer rigid frame portion 115, a bellows portion 116 and a web portion 117 intermediately of and integrally connecting the frame and bellows regions.

The bellows portion 116 as seen in FIGS. 6, 7 and 8 has outer and inner undulations presenting successive crests 118, 119 and 120. The semirigid ring portion 121 is located at the end of the inner undulation to undergo limited axial and transverse movements with the journal without loss of circular stability.

Circular stability is further insured by an array of radially extending ribs 117R provided on the web portion 117 and a common arcuate rib 117A that interconnects the inner extremities of the top group of radial ribs. The top region of the web 117 has a crescent-shaped portion 117C immediately adjacent the bellows 116. The crescent-shaped portion of the mat is of about the same thickness as the radial rib portions of the mat and the arcuate rib 117A is superimposed upon the outer margin of the crescent 117C to provide a composite thickness about the same as the outer frame.

The ribs 117R resist stretching of the web portion and prevent gapping such as would occur if the ring portion 121 were distorted from circular to oval form. The top region of the web, being of greater extent, is more strongly reinforced by the cooperative action of the crescent 117C, the arcuate rib 117A and the top radial ribs 117R.

The FIG. 5 embodiment is also shown to include a wiping finger 122 on the side of the ring 121 remote from the journal fillet region; a metal frame 123 seated within the outer frame; a fin 124 on its wheel side; and a fin 127 on its journal side.

A unique integral hinge 130 connects a wiping finger 122 to the ring portion 121. The wiping finger 122 is circular in outline and circular in cross section and has its outer periphery jointed to the hinge to lie in the substantially common transverse plane. The hinge 130 is annular in outline and substantially flat in cross section and is of a reduced thickness to facilitate reverse flexing and radial distortion of the hinge.

Typical dimensions as given previously for the rear seals for 5×9 journals are applicable except that the wiping finger 122 is of ⅛ inch diameter in cross section and has an inner diameter of 5 11/16 inches and the hinge 130 has a thickness T (see FIG. 7) of 0.050 inch at the region A (see FIG. 6) immediately adjacent the wiping finger.

This uniquely flexible wiping finger and hinge arrangement effectively solves a long standing problem of oil leakage between the journal face and the seal. The problem is particularly difficult in that both axial and transverse journal shifting can occur tending to distort the required circular shape of the seal and tending to twist or warp the seal. The flexing accommodated by the hinge 130 permits the wiping finger to flip axially in either direction without likelihood of twisting. The hinge also accommodates transverse movement without causing twisting or other distortion of the wiping finger. The performance of the hinge is supplemented by the stability of the web portion which enables the bellows to carry the ring in shiftable relation without circular distortion.

Thus, while preferred constructional features of the invention are embodied in the structure illustrated herein, it is to be understood that changes and variations may be made by those skilled in the art without departing from the spirit and scope of the appended claims.

What is claimed is:

1. A dustguard and seal unit for mounting in the dustguard slot of a journal box comprising a mat of molded rubberlike material having an outer rigid frame portion, a bellows portion of circular outline and a web portion intermediately of and integrally connecting the frame and bellows portions, said bellows position integrally merging inwardly with a semirigid ring portion having substantial circular stability during axial and transverse floating movement thereof and said ring portion being characterized in that the ring portion terminates in an intermediate integral portion comprising a flexible hinge of annular outline of greater radial than axial dimension and having an axial dimension of about 0.05 inch and integrally carrying a terminal portion merging with the inner periphery of the hinge to lie in a substantially common transverse plane therewith and comprising a wiping finger of circular outline that can flip axially in either direction without twisting.

2. In an assembly as defined in claim 1 and wherein said web portion is of less thickness axially of the journal than either said frame portion or said ring portion, said web portion having a top group of radially extending ribs above said journal and a bottom group of radially extending ribs below said journal to resist radial stretching of the web portion, sand said web portion having an arcuate rib interconnecting inner extremities of said top group of ribs.

3. In an assembly as defined in claim 2 and wherein said web portion includes a crescent section of increased thickness between the inner extremities of said top group of radially extending ribs and the bellows portion, said arcuate rib being located in superimposed relation upon an outer marginal region of the crescent section.

4. In a journal box, wheeled journal and rear seal assembly, said journal box having spaced walls at the wheel end presenting confronting surfaces provided with axial openings of greater diameter than journal and bordering a dustguard slot that is open at the top and that is bounded along opposite sides and across the bottom by interior journal box wall surfaces, said wheeled journal projecting through said axial openings and extending axially in said box to present a journal seat at the region of said slot and of smaller size than said axial openings, said rear seal comprising a mat of molded rubberlike material of a size and shape to extend to the outer extremities of said slot, said mat having means providing a rigid outer frame portion extending around said outer extremities of said slot and spanning and sealingly contacting said confronting surfaces adjacent to said outer extremities, said mat having a circular bellows portion spaced from and integrally joined to said rigid frame portion through an intermediate planar web portion that encircles said bellows portion, said bellows portion integrally merging inwardly with a semirigid ring portion having substantial circular stability during axial and transverse floating movement thereof that is accommodated by said bellows portion, and said ring portion terminating in an intermediate integral portion comprising a flexible hinge of annular outline of greater radial than axial dimension and having an axial dimension of about 0.05 inch and integrally carrying a terminal portion merging with the inner periphery of the hinge to lie in a substantially common transverse plane therewith and comprising a wiping finger of circular outline that can flip axially in either direction without twisting, said finger being of slightly smaller diameter than the journal seat portion to establish and maintain full length contact therewith during axial and transverse shifting of the journal seat portion relative to the journal box.

* * * * *